United States Patent
Huang et al.

(10) Patent No.: US 9,125,049 B2
(45) Date of Patent: Sep. 1, 2015

(54) CONFIGURING SECURE WIRELESS NETWORKS

(71) Applicant: Oplink Communications, Inc., Fremont (CA)

(72) Inventors: Longgang Huang, San Jose, CA (US); Keqin Gu, Fremont, CA (US); Tsungyen Chen, Palo Alto, CA (US); Yan Qi, Fremont, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 13/843,547

(22) Filed: Mar. 15, 2013

(65) Prior Publication Data

US 2014/0281478 A1    Sep. 18, 2014

(51) Int. Cl.
    *H04W 12/04* (2009.01)
    *H04N 7/18* (2006.01)
    *H04W 12/08* (2009.01)
    *H04W 4/00* (2009.01)
    *H04L 29/06* (2006.01)
    *H04W 84/12* (2009.01)
    *H04L 12/28* (2006.01)

(52) U.S. Cl.
    CPC ............... *H04W 12/04* (2013.01); *H04N 7/181* (2013.01); *H04W 4/001* (2013.01); *H04W 12/08* (2013.01); *H04L 12/2807* (2013.01); *H04L 63/062* (2013.01); *H04W 84/12* (2013.01)

(58) Field of Classification Search
    CPC ............................... H04W 12/04; H04W 12/08
    See application file for complete search history.

(56) References Cited

U.S. PATENT DOCUMENTS

| 2001/0049277 | A1* | 12/2001 | Meyer et al. | 455/414 |
| 2006/0098899 | A1* | 5/2006 | King et al. | 382/305 |
| 2006/0161960 | A1* | 7/2006 | Benoit | 725/105 |
| 2006/0271695 | A1* | 11/2006 | Lavian | 709/229 |

(Continued)

FOREIGN PATENT DOCUMENTS

| DE | 10 2006 038591 | 2/2008 |
| EP | 2 071 800 | 6/2009 |
| WO | WO 2012/167200 | 12/2012 |

OTHER PUBLICATIONS

Supplemental European Search Report Received in European Patent Application No. 14159845.8, filed Mar. 14, 2014. Received Jul. 7, 2014. 3 pages.

(Continued)

*Primary Examiner* — Gilberto Barron, Jr.
*Assistant Examiner* — Arya Golriz
(74) *Attorney, Agent, or Firm* — Fish & Richardson P.C.

(57) ABSTRACT

Methods, systems, and apparatus, including computer programs encoded on computer storage media, for configuring secure wireless networks. One of the methods includes receiving, at a security system management device, protocol and key information for establishing a connection as a client device to the wireless IP device, wherein the protocol and key information is received in response to a user transmitting an identifier for the IP device to a service provider system; establishing communication with the wireless IP device, wherein the wireless IP device is acting as an access point device; exchanging keys with the wireless IP device; rebooting the security system management device to become an access point for the secure wireless network; and establishing communication with the wireless IP device, wherein the wireless IP device has become a wireless client.

9 Claims, 2 Drawing Sheets

(56) References Cited

U.S. PATENT DOCUMENTS

| | | | |
|---|---|---|---|
| 2006/0285507 A1* | 12/2006 | Kinder et al. | 370/310 |
| 2008/0028459 A1* | 1/2008 | Suh et al. | 726/14 |
| 2008/0171532 A1* | 7/2008 | Shieh et al. | 455/410 |
| 2008/0205860 A1* | 8/2008 | Holtman | 386/125 |
| 2009/0121861 A1* | 5/2009 | Latham et al. | 340/522 |
| 2009/0127328 A1* | 5/2009 | Aissa | 235/377 |
| 2009/0157868 A1* | 6/2009 | Chaudhry | 709/224 |
| 2009/0222455 A1* | 9/2009 | Molinie et al. | 707/10 |
| 2010/0217845 A1* | 8/2010 | Doshi et al. | 709/221 |
| 2010/0246788 A1* | 9/2010 | Menard et al. | 379/159 |
| 2011/0113234 A1* | 5/2011 | Augenstein et al. | 713/150 |

OTHER PUBLICATIONS

Communication Pursuant to Article 94(3) EPC as received in European Patent Application No. 14159845.8, filed Mar. 14, 2014. Received Jul. 22, 2014. 6 pages.

Translation of Taiwanese Office Action received in Taiwan Patent Application No. 103109140, filed Mar. 13, 2014. Received May 13, 2015. 6 Pages.

* cited by examiner

CONFIGURING SECURE WIRELESS NETWORKS

BACKGROUND

This specification relates to secure wireless networks.

Wireless networks are typically advantageous over their wired counterparts, because they eliminate the need for stringing lengths of wire around a network site. This is especially useful in a home or enterprise security system in which multiple surveillance cameras and various sensors may be strategically placed around, both inside and outside, the home or office. Wireless networks further have the advantage that they cannot be easily circumvented by merely cutting the wired connections to network devices.

One conventional technique for adding a new device to a home network requires user input to provide configuration information. For example, a user can purchase a wireless device that is, typically, initially configured as an access point (AP) device. The user can use their mobile device to identify this AP device on their WiFi network and enter a password. The wireless device/AP device requests configuration information from the user of the mobile device, for example, a home router network service set identifier "SSID" and password. The user provides the requested information through the mobile device using an appropriate application. The wireless device/AP device is rebooted as a client device. An association is then made and the IP device is coupled to the home network.

SUMMARY

In general, one innovative aspect of the subject matter described in this specification can be embodied in methods for adding a new wireless IP device to a secure wireless network that include the actions of receiving, at a security system management device, protocol and key information for establishing a connection as a client device to the wireless IP device, wherein the protocol and key information is received in response to a user transmitting an identifier for the IP device to a service provider system; establishing communication with the wireless IP device, wherein the wireless IP device is acting as an access point device; exchanging keys with the wireless IP device; rebooting the security system management device to become an access point for the secure wireless network; and establishing communication with the wireless IP device, wherein the wireless IP device has become a wireless client.

The foregoing and other embodiments can each optionally include one or more of the following features, alone or in combination: The IP device is an IP camera, IP based power plug, IP based thermostat, or other IP based security or automation device. The wireless IP device also receives key information from the service provider system. The IP device reboots following the key exchange, becoming a wireless client after the reboot. The identifier is a barcode scanned from the IP device. The identifier is a serial number for the IP device. Establishing communication with the wireless IP device as a client includes performing one or more of http request or receive functions. The http request function is used to request video data from the IP device.

In general, one innovative aspect of the subject matter described in this specification can be embodied in systems that include a security system management device, wherein the security system management device manages a particular secure wireless network; a wireless internet protocol (IP) device to be added to the secure wireless network; and a mobile device, wherein the IP device is activated using the mobile device including transmitting an identifier associated with the IP device to an external service provider system, wherein the security system management device receives protocol and key information for the IP device in response to the mobile device transmission, and wherein responsive to the received protocol the security system is configured as a WiFi client that seeks to communicate with the IP device, wherein the IP device is acting as an access point; wherein the IP device receives key information such that the IP device and security system manager exchange keys; and wherein after the key exchange, the security system manager reboots to become an access point for the network and the IP device reboots to become a wireless client for the network.

Particular embodiments of the subject matter described in this specification can be implemented so as to realize one or more of the following advantages. Wireless devices, e.g., internet protocol (IP) cameras, can be added to a secure wireless network without user configuration of the IP wireless device and without the need for preloaded SSID/Key pairs. Additionally, a security management device does not need to upload agent software to client wireless devices nor do the wireless devices need to be preprogramed with appropriate software. Instead, the security management device can use HTTP request and receive functions directed to the wireless device.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
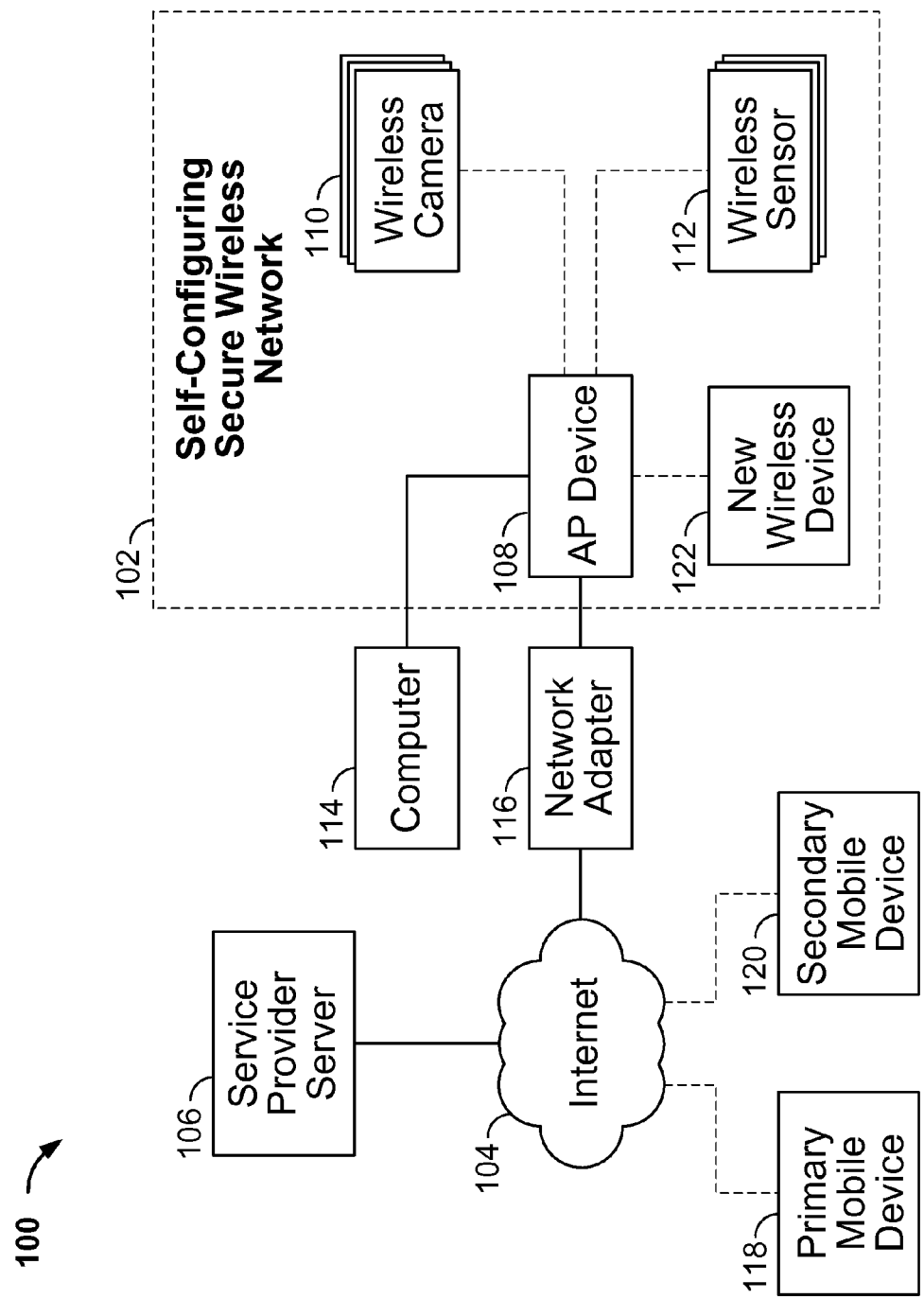
FIG. 1 is a diagram of an example security system.

FIG. 1 is a diagram of an example security system 100. The security system 100 includes a secure wireless network 102, which is connected through the Internet 104 to a service provider system 106.

The secure wireless network 102 includes a security management device 108 and wireless enabled devices 110, 112. The security management device 108 can be an access point device. In some implementations, the security management device 108, optionally in conjunction with the service provider system 106, can determine and use appropriate keys to configure the wireless enabled devices 110, 112 thereby establishing a self-configured secure wireless network 102 with minimal or no user interaction.

In a typical home security system, several strategically positioned cameras 110 and sensors 112 may be included. In addition to sensors included for security purposes such as movement and displacement sensors, for example, detecting the opening of doors and windows, other sensors providing other useful information may be included such as doorbell sensors, smoke detector alarm sensors, temperature sensors, and/or environmental control sensors and/or controls.

An additional wireless device 122 is also shown, which has been subsequently added to the secure wireless network 102 after the installation of the secure wireless network 102 in the home security system. Hence, it is referred to as being a "new" wireless device. Similar to the wireless enabled devices 110, 112, the new wireless device 122 can be added to the secure wireless network using an appropriate key. One example technique for adding a new wireless device to a secure wireless network is described below with respect to FIG. 2.

As shown in FIG. 1, the security management device 108 includes a router for the home security system. Therefore, all devices that are to be networked are communicatively coupled to the security management device 108. To this end, the security management device includes at least one of an Ethernet receptacle or Universal Serial Bus (USB) receptacle so that various devices such as a computer 114 may be wire-coupled to it, e.g., through an Ethernet connection. The security management device 108 is configured to be in "router" mode. As such it can be referred to as being a router security management device.

The security management device 108 is communicatively coupled, e.g., through an Ethernet connection, to a network adapter 116, e.g., a modem or directly to the Internet through an ISP. In some implementations, a broadband connection is used for high speed transmission of video data from the one or more wireless cameras and sensor data from the wireless sensors. The security management device 108 can include a Dynamic Host Configuration Protocol (DHCP) server which is configured to assign IP subaddresses to devices connecting through the security management device 108 to the Internet 104.

In some implementations, the security management device 108 includes a software agent residing in it that establishes communication with a remote service provider system 106 upon the security management device 108 being powered up and after it has been joined to the Internet 104 through the network adapter 116, which serves as an Internet gateway. The service provider system 106 interacts with the security management device 108 and authorized devices, e.g., primary and secondary mobile devices 118 and 120, to perform various functions and/or services.

The mobile devices 118 and 120 can include software agents or resident applications for such interaction with the service provider system 106. Devices that are attempting to interact with the service provider system 106 may confirm their authority to the service provider system 106, for example, by providing information that uniquely identifies the requesting device, e.g., an Internet Protocol (IP) address, a product serial number, or a cell phone number. Alternatively, they may provide a user name and password which are authorized to interact with the secure wireless network 102. To facilitate such authorization procedures, the service provider system 104 can store or have ready access to such authorization information for each secure wireless network of users who subscribe to the service. The mobile devices 118 and 120 can be used to receiving information from the security system, e.g., alarm information, as well as used to control functions of the security system.

Figure 2:
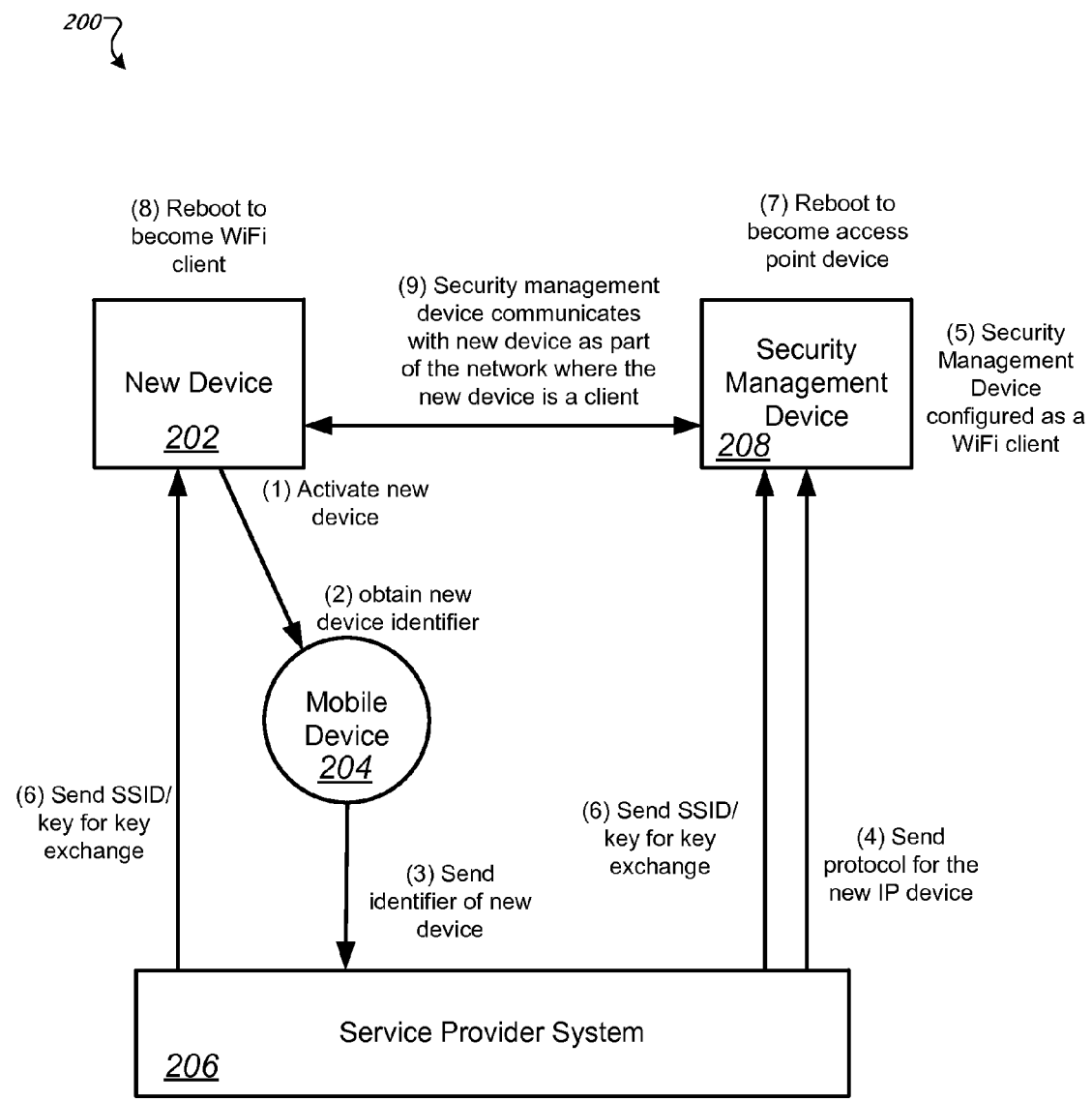
FIG. 2 is a diagram illustrating an example process for integrating a device into a secure wireless network.
Like reference numbers and designations in the various drawings indicate like elements.

FIG. 2 is a diagram 200 illustrating an example process for integrating a device into a secure wireless network. In particular, a new device 202 is being added to a self-configuring secure wireless network managed by security management device 208. For example, the self-configuring secure wireless network and associated devices can be similar to the self-configuring secure wireless network 102 and devices shown in FIG. 1.

The new device 202 can be, for example, a wireless IP device such as an IP camera. A user can add the IP camera as part of a home security system. In particular, the new device 202 can be configured as an access point device, for example, having a build-in router that is capable of allowing the new device 202 to connect to an external network including the Internet. An access point is a device that allows wireless devices to connect to a network using WiFi or related standards. Thus, other wireless devices can potentially connect to the access point as client devices. In particular, vendors of wireless IP devices typically configure the device to act as an access point.

The security management device 208 can be a wireless control unit that can be configured, for example, as a bridge, and access point, or a client. The security management device 208 is communicatively coupled to the internet, e.g., by Ethernet to a home router, through which the security management device can communicate with service provider system 206. The security management device 208 also manages devices of the security system using the established secure wireless network. The devices can include other IP cameras as well as various security sensors. The home security system can be implemented, for example, as described above with respect to FIG. 1.

The new device 202 is activated (1). For example, the user can position the new device at a particular location and power it up. The user can also determine an identifier of the new device 202, for example, a serial number, bar code, QR code, or other identifier.

The identifier of the new device 202 is obtained (2) and entered into a mobile device 204. The mobile device 204 can be for example a mobile phone or tablet device of the user. The identifier of the new device 202 can be entered into the mobile device 204, for example, manually by the user or scanned into the mobile device, e.g., using a camera integrated into the mobile device, e.g., using barcode or QR code reading software.

The mobile device 204 transmits the identifier (3) of the new device 202 to a service provider system 206. The service provider system 206 uses the received identifier to look up information about the new device 202. For example, the identifier can be used to look up information in a registry or database associating device identifiers with corresponding device information. The registry or database can include information for wireless devices provided by various different vendors. For example, the device information can include protocol information associated with the device. This information can include a device type profile or one or more application programming interfaces (API) that can be used to communicate with the new device 202.

The service provider system 206 sends (4) data to the security management device 208 identifying the protocol the new device 202 is operating under.

In response to receiving the protocol data, the security management device 202 behaves as a wireless client (5). As a client, the security management device can use the protocol information to identify and seek to connect with the new device 202 functioning as an access point device.

The service provider system 206 passes (6) an SSID/key pair to the security management device 208 and the new device 202 for use in a key exchange process between the security management device and the new device to generate a secure connection. In particular, the new device 202 is in communication with one or more networks allowing communication with the service provider system 206, e.g., using the built in router and, for example, an Ethernet or other type of connection. In some implementations, the SSID/key pair is chosen specifically for the relationship between the new device 202 and the security management device 208. In some other implementations, the SSID/key pair is used for joining all devices to the secure wireless network. In such scenarios, the security management device 208 may already have the SSID/key pair. Various existing key exchange techniques can be used.

After the secure connection has been established between the service provider system 206 and the security management device 208, the security management device reboots (7) to become return to being an access point device. Additionally, the new device 202 reboots (8) to become a wireless client. In particular, the security management device 208 determines that the new device 202 has the new SSID and key/Password. Then both the security management device 208 and the new device 202 can reboot in which the new device 202 is wireless client and the security management device 208 is now the access point device.

The security management device 208 communicates (9) with the new device 202 as part of the secure wireless network where the new device 202 operates as a client device managed by the security management device 208. The security management device 208 can communicate with the new device 202 using http request and receive functions, e.g., a GET request. For example, in the case of an IP camera device, the security management device 208 can request data from the IP camera using, e.g., "http://IP/cgi/getdata" request wherein the response from the IP camera would be corresponding data such as video, image, or text data.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for adding a new wireless IP device to a secure wireless network comprising:

receiving, at a security system management device, protocol and key information for establishing a connection as a client device to the wireless IP device within the secure wireless network, wherein the protocol and key information is received from a remote service provider system in response to a user transmitting an identifier for the IP device to the service provider system, wherein the security system management device operates as an access point device;

in response to receiving the protocol and key information, establishing, by the security system management device communication with the wireless IP device, wherein the security system management device operates as a client requesting to connect to the wireless IP device, which is acting as an access point device;

exchanging keys with the wireless IP device to establish secure communication within the secure wireless network;

in response to establishing secure communication with the wireless IP device, rebooting the security system management device to return to operating as the access point device for the secure wireless network; and establishing communication with the wireless IP device using the exchanged keys, wherein the wireless IP device has become a wireless client device managed by the security management device.

2. The method of claim 1, wherein the IP device is an IP camera, IP based power plug, IP based thermostat, or other IP based security or automation device.

3. The method of claim 1, wherein the wireless IP device also receives key information from the service provider system.

4. The method of claim 1, wherein the IP device reboots following the key exchange, becoming a wireless client after the reboot.

5. The method of claim 1, wherein the identifier is a barcode scanned from the IP device.

6. The method of claim 1, wherein the identifier is a serial number for the IP device.

7. The method of claim 1, wherein establishing communication with the wireless IP device as a client includes performing one or more of http request or receive functions.

8. The method of claim 7, wherein the http request function is used to request video data from the IP device.

9. A system comprising:

a security system management device, wherein the security system management device manages a particular secure wireless network;

a wireless internet protocol (IP) device to be added to the secure wireless network; and a mobile device, wherein the IP device is activated using the mobile device including transmitting an identifier associated with the IP device to an external service provider system, wherein the security system management device receives protocol and key information for the IP device from the external service provider system in response to the mobile device transmission of the identifier for the IP device, and wherein responsive to the received protocol the security system management device changes from an access point to be configured as a WiFi client that seeks to communicate with the IP device, wherein the IP device is acting as an access point;

wherein the IP device receives key information such that the IP device and security system manager exchange keys to establish secure communication within the secure wireless network; and wherein after the key exchange and in response to establishing secure communication with the wireless IP device, the security system management device reboots to return to being configured as the access point for the secure wireless network and the IP device reboots to become a wireless client for the secure wireless network, and wherein the security system management device establishes communication with the wireless IP device using the exchanged keys.

* * * * *